(12) United States Patent
Blaabjerg et al.

(10) Patent No.: US 12,338,800 B2
(45) Date of Patent: Jun. 24, 2025

(54) WIND TURBINE AND METHOD FOR MOUNTING A PLATFORM TO A WALL PORTION OF A WIND TURBINE

(71) Applicant: Siemens Gamesa Renewable Energy A/S, Brande (DK)

(72) Inventors: Hans Kjaer Blaabjerg, Gevded (DK); Jesper Gjelstrup Kristiansen, Viby J (DK); Thomas Smedegaard, Åbyhøj (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 814 days.

(21) Appl. No.: 17/427,172

(22) PCT Filed: Jan. 29, 2020

(86) PCT No.: PCT/EP2020/052182
§ 371 (c)(1),
(2) Date: Jul. 30, 2021

(87) PCT Pub. No.: WO2020/157143
PCT Pub. Date: Aug. 6, 2020

(65) Prior Publication Data
US 2022/0099070 A1 Mar. 31, 2022

(30) Foreign Application Priority Data
Jan. 31, 2019 (EP) ..................................... 19154715

(51) Int. Cl.
*F03D 80/80* (2016.01)
*E04G 3/24* (2006.01)
*F03D 13/20* (2016.01)

(52) U.S. Cl.
CPC ............... *F03D 80/80* (2016.05); *E04G 3/24* (2013.01); *F03D 13/20* (2016.05); *F05B 2230/61* (2013.01)

(58) Field of Classification Search
CPC .......... F03D 80/50; F03D 80/80; F03D 13/20; E04G 3/24; F05B 2230/61; Y02E 10/72; Y02E 10/728
See application file for complete search history.

(56) References Cited

U.S. PATENT DOCUMENTS

| | | | |
|---|---|---|---|
| 5,301,770 A | 4/1994 | Regan et al. | |
| 5,503,033 A | 4/1996 | Van Niekerk | |

(Continued)

FOREIGN PATENT DOCUMENTS

| | | |
|---|---|---|
| CN | 1108203 A | 9/1995 |
| CN | 101737273 A | 6/2010 |

(Continued)

OTHER PUBLICATIONS

International Search Report and Written Opinion of the International Searching Authority issued Mar. 13, 2020 for Application No. PCT/EP2019/083808.

(Continued)

*Primary Examiner* — Moshe Wilensky
(74) *Attorney, Agent, or Firm* — Schmeiser, Olsen & Watts LLP

(57) ABSTRACT

A wind turbine, including: a tower including a wall portion and a flange, a platform, and a stay suspending the platform from the wall portion, wherein the stay is pivotably connected to the platform and/or the wall portion, and wherein a diameter of the platform is smaller than an inner diameter of the tower at the flange, is provided. The platform can be (Continued)

Figure 1:
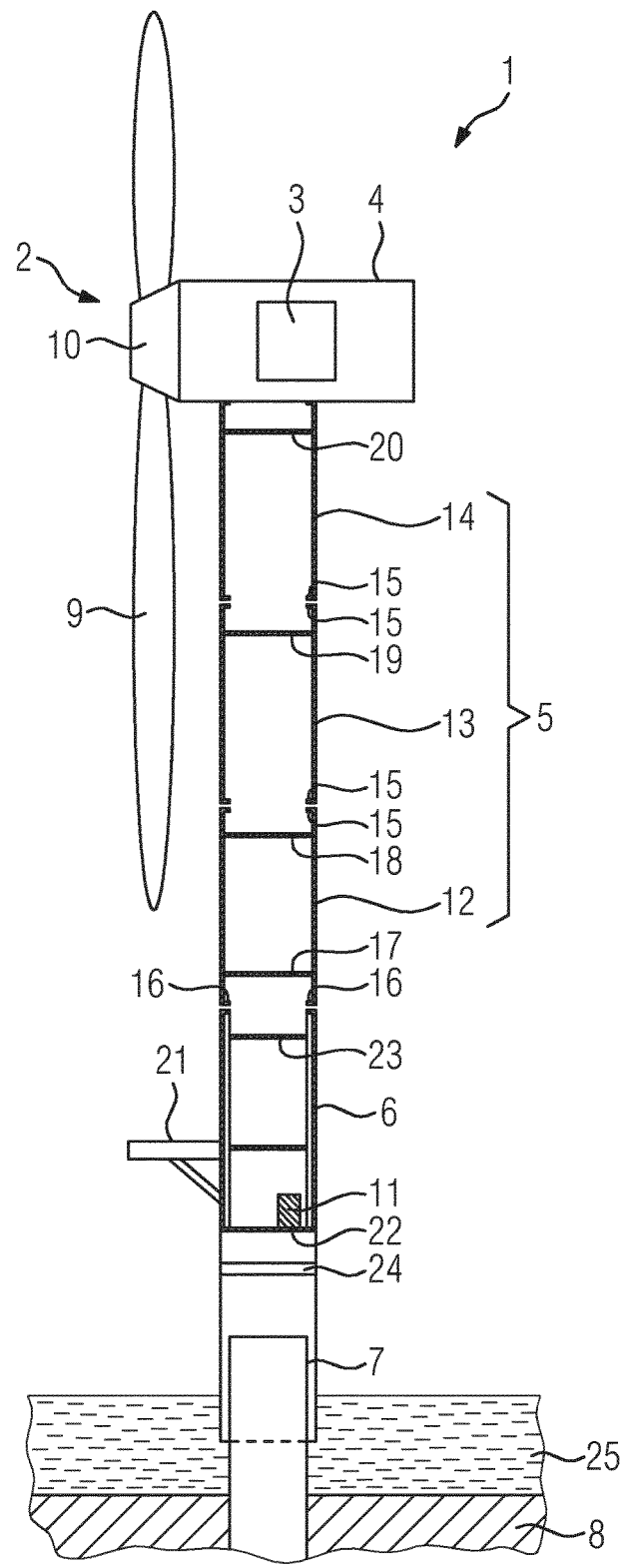

mounted inside a tower of the wind turbine even when the platform has a diameter that is significantly smaller than an inner tower diameter.

15 Claims, 5 Drawing Sheets

(56) References Cited

U.S. PATENT DOCUMENTS

| | | |
|---|---|---|
| 2010/0122508 A1 | 5/2010 | Kristensen |
| 2011/0252720 A1 | 10/2011 | Kristensen |
| 2012/0241255 A1 | 9/2012 | Gomez Santamaria et al. |
| 2015/0361679 A1 | 12/2015 | Kent et al. |
| 2016/0169192 A1 | 6/2016 | Aranzadi De Miguel et al. |
| 2018/0238071 A1* | 8/2018 | Chase ..................... F03D 13/10 |

FOREIGN PATENT DOCUMENTS

| | | |
|---|---|---|
| CN | 202007746 U | 10/2011 |
| CN | 102434404 A | 5/2012 |
| CN | 202284525 U | 6/2012 |
| CN | 102691474 A | 9/2012 |
| CN | 103061992 A | 4/2013 |
| CN | 203822553 A | 9/2014 |
| CN | 205475706 U | 8/2016 |
| CN | 106593779 A | 4/2017 |
| CN | 107687398 A | 2/2018 |
| DE | 102010008639 A1 | 8/2011 |
| DE | 102017128143 B3 | 1/2019 |
| EP | 2784310 A1 | 10/2014 |

OTHER PUBLICATIONS

International Search Report and Written Opinion of the International Searching Authority issued Aug. 3, 2020 for Application No. PCT/EP2020/052182.

* cited by examiner

WIND TURBINE AND METHOD FOR MOUNTING A PLATFORM TO A WALL PORTION OF A WIND TURBINE

CROSS-REFERENCE TO RELATED APPLICATIONS

This application is a national stage entry of PCT Application No. PCT/EP2020/052182 having a filing date of Jan. 29, 2020, which claims priority to European Patent Application No. 19154715.7, having a filing date of Jan. 31, 2019, the entire contents of which are hereby incorporated by reference.

FIELD OF TECHNOLOGY

The following relates to a wind turbine and to a method for mounting a platform to a wall portion of a wind turbine.

BACKGROUND

Conventionally, platforms in wind turbines are resting on a flange or on brackets extending inwardly from an inside wall surface of the tower. Therefore, the platforms are required to have a larger diameter than the flange or the bracket distance. Thus, the platforms are either manufactured from segments and inserted in segments into the tower. Alternatively, the platforms are inclined for insertion into the tower.

US 2015 361 679 A1 discloses a suspended deck system. Further, a method of installing a suspended deck system and repairing a suspended deck system is disclosed. The suspended deck system comprises a plurality of bosses, a plurality of links, and a deck.

CN 103 061 992 B discloses an operating platform of a wind turbine which is detachably connected with a lifting lug embedded in a concrete shell ring inner wall. The operating platform comprises a first platform box and a plurality of first platforms, a side wall of the first platform box is provided with first openings for the first platforms to penetrate, and lengths of the first platforms extending out of the first platform box are adjustable.

SUMMARY

It is one aspect of the present invention to provide an improved wind turbine and an improved method for mounting a platform to a wall portion of the wind turbine.

Accordingly, a wind turbine is provided. The wind turbine comprises a wall portion, a platform, and a stay suspending the platform from the wall portion. The stay is pivotably connected to the platform and/or the wall portion.

Further, the wind turbine may comprise a tower including the wall portion, and a flange. A diameter of the platform may be smaller than an inner diameter of the tower at the flange. The flange may protrude from an inside surface of the wall portion towards a center of the tower. The flange may be ring-shaped, in particular circular. The flange or ring may have its main plane of extension in a horizontal direction, i.e. perpendicular to the center axis of the tower in operation.

The platform can be inserted in the vertically erected tower in one piece and without inclining the platform because the diameter of the platform can be configured smaller than the diameter of the tower at the narrowest portion of the tower interior, in particular at the flange of the tower. Hence, the platform can be inserted in one piece into the tower without the need to manufacture the platform in segments and assemble the platform segments inside the tower.

The stay is, pivotably connected to the platform and/or the wall portion such that the stay can be pivoted around an axis which is perpendicular to a radius/diameter of the platform and/or of the tower. The stay is, pivotably connected to the platform and/or the wall portion such that the stay can be pivoted outwardly, i.e. away from the platform and/or in the direction of the wall portion, and/or inwardly, i.e. towards the center of the platform and/or in the direction of the interior of the tower. In other words, the stay is, pivotably connected to the platform and/or the wall portion such that an angle between the platform and the stay and/or an angle between the stay and the wall portion can be varied. The stay is, a stiff (rigid) element extending along a longitudinal axis. The stay is, configured to transmit tensile and compressive forces along the longitudinal axis.

For example, for installation of the stay, the stay is pivotably connected with the platform before inserting the platform into the tower. Thereby, the angle between the stay and the platform is set to approximately 90 degrees or less than 90 degrees by pivoting (folding) the stay inwardly. After insertion of the stay, the stay is pivoted (folded) outwardly such that the angle between the stay and the platform becomes more than 90 degrees for connection with the wall portion. In this way, the platform can be inserted into the tower with the stay connected to the platform and folded in to fit through the narrowest portion of the tower, in particular through the flange. In particular, it is possible to insert the platform in a horizontal orientation into the vertical tower and/or the vertical tower section without the need to incline the platform.

In another example, for installation of the stay, the stay is pivotably connected with the wall portion before inserting the platform into the tower or the transition piece. Thereby, the angle between the stay and the wall portion is set to approximately 0 degrees and is then set to more than 0 degrees and less than 90 degrees for connection with the platform.

Further, it is possible to mount the platform inside the tower even when the platform has a diameter that is significantly smaller than an inner tower diameter. Further, it is possible to adjust the stay by pivoting the stay to platforms with different diameters. Thus, having the stay that is pivotably connected with the platform and/or the wall portion allows to connect platforms with different diameters to the wall portion by means of the same stay.

A wind turbine is an apparatus to convert the wind's kinetic energy into electrical energy. The wind turbine comprises, for example, a rotor having one or more blades, a nacelle comprising a generator and a tower holding, at its top end, the nacelle. The tower of the wind turbine may be connected via a transition piece to a foundation of the wind turbine such as a monopile in the sea bed.

The wall portion is, in particular, a tower wall portion, i.e. a portion of the tower wall, in particular having a surface facing towards an interior of the tower. The wall portion is for example an annular portion of the interior tower wall. The wall portion may also comprise a flange of the tower. The wall portion may be located at any height of the tower such that the platform can be arranged at any height of the tower. The tower of the wind turbine may comprise in its interior the platform connected to the wall portion.

In another example, the platform can also be a platform of the transition piece of the wind turbine. The transition piece connects the tower with the foundation of the wind turbine such as the monopile. In this example, the wall portion is an interior wall portion of the transition piece. Also in this case, the wall portion can be, for example, an annular portion of the interior wall of the transition piece and/or can comprise a flange of the transition piece.

The platform can be configured for carrying electrical or mechanical devices required for the operation of the wind turbine, such as a low voltage transformer and a switch gear. The platform can also be configured as a working platform, e.g., for performing work during the assembly of the wind turbine and/or maintenance work during the operation of the wind turbine.

The platform includes platform connecting means connected with the stay. The platform connecting means are, for example, holes. Further, the platform includes, for example, a platform bracket and the platform bracket includes the platform connecting means.

The stay is mechanically connecting the tower or a portion thereof or the transition piece or a portion thereof with the platform such that the weight of the platform is supported by the stay. In particular, the stay is connected to the wall portion at a larger height than a height of the platform. Thus, the platform is hanging down from the wall portion by means of the stay.

The wall portion comprises, in particular, wall connecting means for connection with the stay. The wall connecting means are, for example, holes. Further, the wall portion comprises, for example, a bracket mounted to the wall portion and the bracket includes the wall connecting means.

The wind turbine includes in particular two, three, four or more stays suspending the platform from the wall portion. The stays are each pivotably connected to the platform and/or the wall portion.

According to an embodiment, the wind turbine is configured for connecting a service stay to the platform and the wall portion. The service stay suspends the platform from the wall portion to allow replacement of the stay.

A replacement of the stay may be necessary in case of corrosion and/or damage of the stay. The wind turbine is configured for connecting the service stay to the platform and the wall portion particularly while the stay is still connected to the platform and the wall portion. When the service stay fully supports the weight of the platform or a portion thereof, the stay can be safely replaced.

The wall connecting means of the wall portion include, in particular, first wall connecting means connected with the stay and second wall connecting means for a connection with the service stay. Further, the platform connecting means include first platform connecting means connected with the stay and second platform connecting means for a connection with the service stay.

Having the configuration of the wind turbine such that a service stay can be connected to the platform and the wall portion allows replacement of the stay without demounting and/or removing the platform from the wall portion. In particular, it allows replacement of the stay without the need to remove devices and/or people from the platform.

According to a further embodiment, the service stay, when connected, forms at its connection points on the platform and the wall portion together with connection points of the stay on the platform and the wall portion a parallelogram.

In particular, the connection points on the platform are defined by the first platform connecting means and the second platform connecting means. Likewise, the connection points on the wall portion are defined by the first wall connecting means and the second wall connecting means.

As the connection points are formed by pivotable connections, the parallelogram can change its shape. Thus, having the arrangement of the connection points of the platform and of the wall portion in the form of a parallelogram, it is not required to adjust the length of the service stay for different angles at which the stay is connected to the platform and/or the wall portion.

According to a further embodiment, the platform and/or the wall portion comprise holes at which the stay is connected pivotably and/or at which the service stay is connectable.

In particular, the first platform connecting means and/or the second platform connecting means each comprise a hole. Further, the first wall connecting means and/or the second wall connecting means each comprise a hole.

Having the holes on the platform allows the stay to be connected to the platform by means of a first fastener engaging the respective hole. Further, it allows the service stay to be connectable to the platform by means of a second fastener engaging the respective hole.

Having the holes on the wall portion allows the stay to be connected to the wall portion by means of a third fastener engaging the respective hole. Further, it allows the service stay to be connectable to the wall portion by means of a fourth fastener engaging the respective hole.

The first, second, third and/or fourth fastener is, for example, a bolt.

According to a further embodiment, one or more of the holes are configured as slotted holes.

Having the slotted holes allows to take up tolerances. During assembly, the platform is, for example, lifted up by a jack to a certain height for connection with the wall portion. Having the slotted holes allows to compensate for a height difference between the platform which has been lifted up by the jack and the wall portion including the wall connecting means.

In embodiments, the stay comprises one or more slotted holes. Having the slotted holes of the stay is another way to compensate for a variable or unknown height difference between the platform and the wall portion, in particular during assembly.

According to a further embodiment, the wind turbine comprises the service stay.

According to a further embodiment, the service stay is configured to be shortened and extended.

Having the service stay configured to be shortened and extended allows, after connecting the service stay to the platform and the wall portion, to shorten the service stay until the weight of the platform is supported by the service stay. When the weight of the platform is supported by the service stay, the stay is loose and can be demounted.

According to a further embodiment, the service stay comprises hydraulic or electric means for shortening and extension.

The hydraulic means include, for example, a hydraulic cylinder. The electric means include, for example, an electric motor.

According to a further embodiment, the service stay is configured to be locked at a desired state when shortened or extended.

In particular, the locking of the service stay may include engagement of moveable elements of the hydraulic or electric means or portions thereof such that the movement of these elements relative to each other is prevented.

Having the service stay configured to be locked at a desired state when shortened or extended allows to securely support the weight of the platform by the service stay and securely demount the stay for replacement.

According to a further embodiment, the wind turbine comprises a tower including the wall portion. Furthermore, a diameter of the platform is smaller than an inner diameter of the tower at the wall portion such that a gap is formed between the platform and the wall portion.

According to a further embodiment, the wind turbine comprises a spacer arranged between the platform and the wall portion. The spacer is configured to bridge the gap so as to fix the platform in the horizontal direction.

The spacer is, for example, configured to be adjustable such that it can adjust to variable sizes of the gap. The spacer is for example a machine foot.

Having the spacer allows to fix the platform in the horizontal direction such that the platform is prevented from moving in the horizontal direction.

According to a further embodiment, the platform comprises a low voltage transformer.

The low voltage transformer is, for example, configured for a power supply of auxiliary devices of the wind turbine such as lights, batteries, Global Positioning System (GPS). The low voltage transformer provides, for example, a voltage output (high voltage side) in the range of 0-1000 V.

The platform comprising the low voltage transformer is not inclined during installation in the tower. Having the platform comprising the low voltage transformer suspended by the stay allows to install the low voltage platform without inclining it because of the pivotable stay.

According to a further aspect, a method for mounting the platform to the wall portion of the wind turbine previously described is proposed. The method comprises:
  connecting the stay pivotably to one of the platform or the wall portion,
  pivoting the stay and connecting the stay to the other one of the platform and the wall portion to suspend the platform from the wall portion.

According to an embodiment of the further aspect, the method comprises the steps of:
  connecting a service stay to the platform and the wall portion,
  replacing the stay, and
  disconnecting the service stay from the platform and the wall tower portion.

According to an even further aspect, there is provided a use of a service stay in the above-mentioned wind turbine to temporarily connect the platform and the wall portion in order to replace the stay.

The embodiments and features described with reference to the apparatus of the present invention apply mutatis mutandis to the method of the present invention.

Further possible implementations or alternative solutions of the embodiment of the present invention also encompass combinations—that are not explicitly mentioned herein—of features described above or below with regard to the embodiments. The person skilled in the art may also add individual or isolated aspects and features to the most basic form of the present invention.

BRIEF DESCRIPTION

Figure 2:
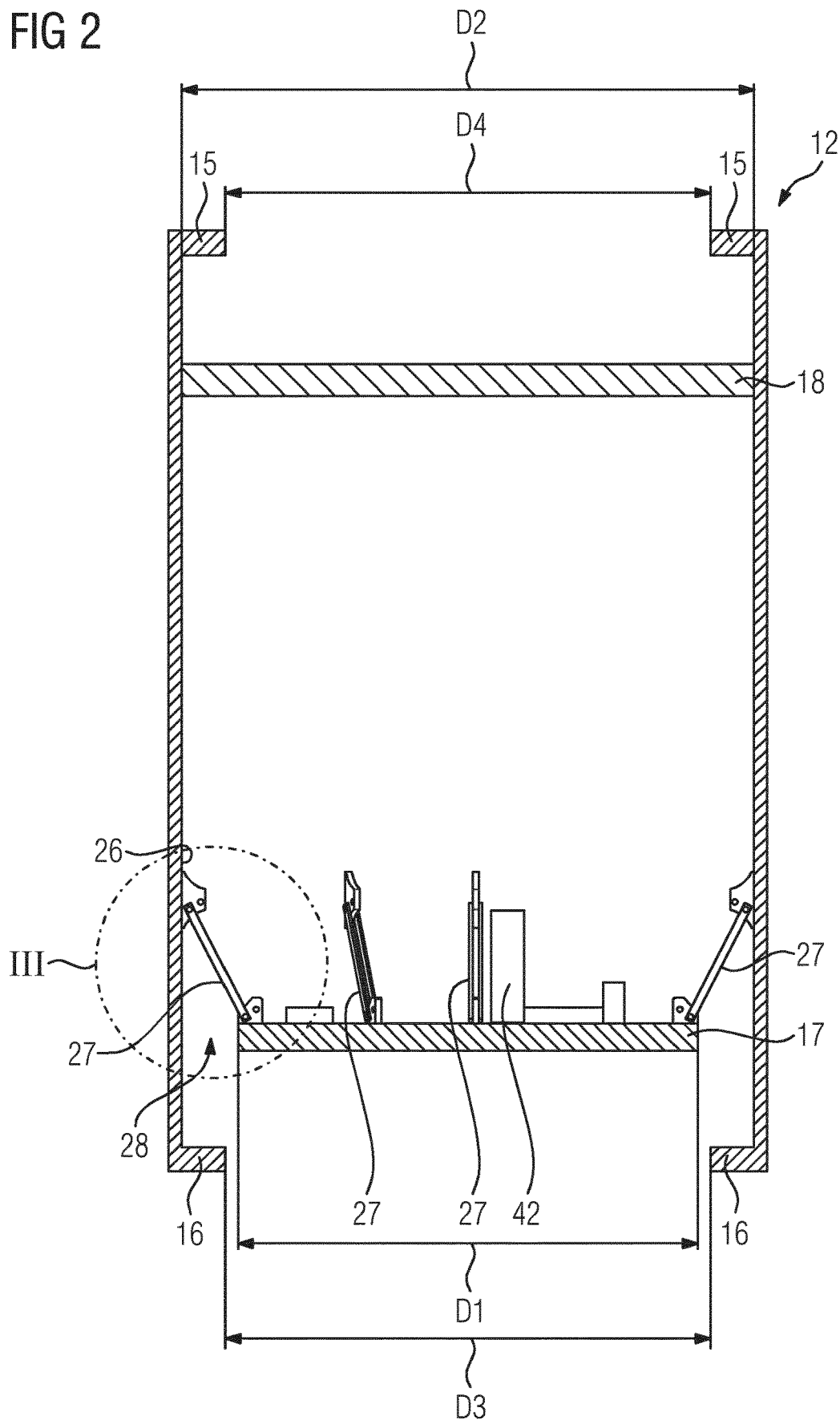
Figure 3:
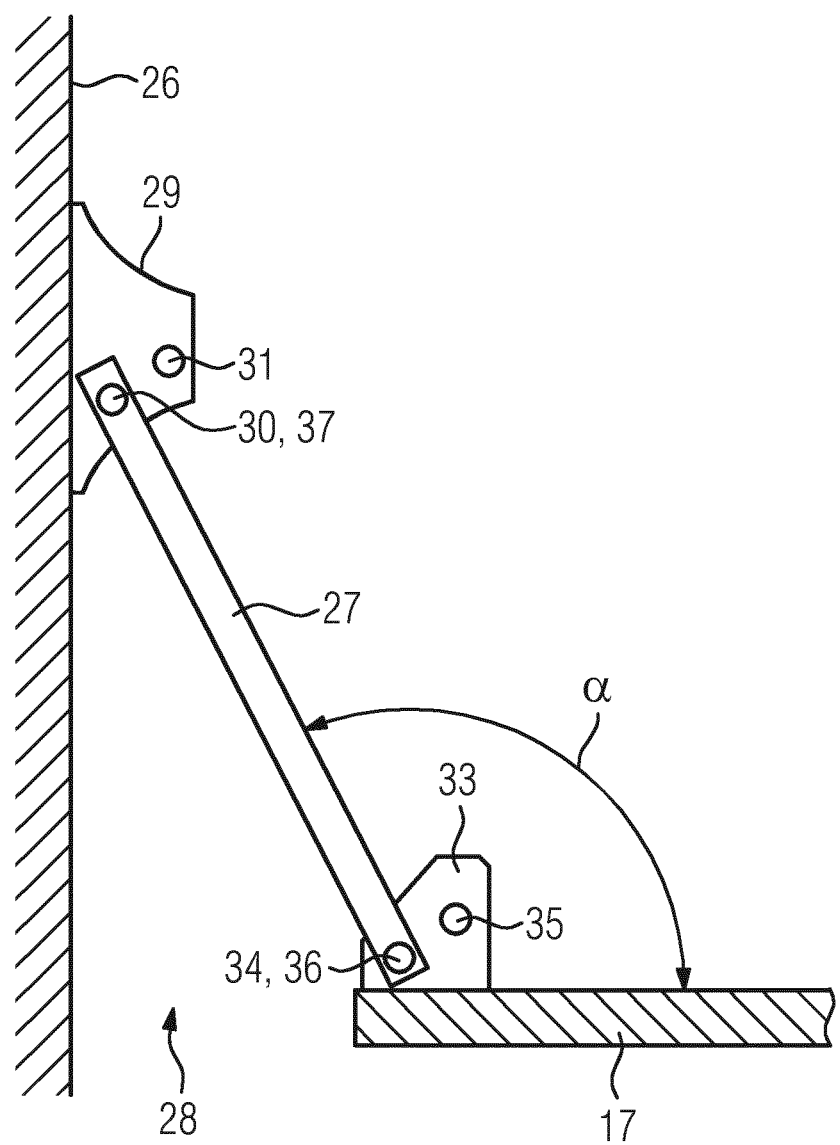
Figure 4:
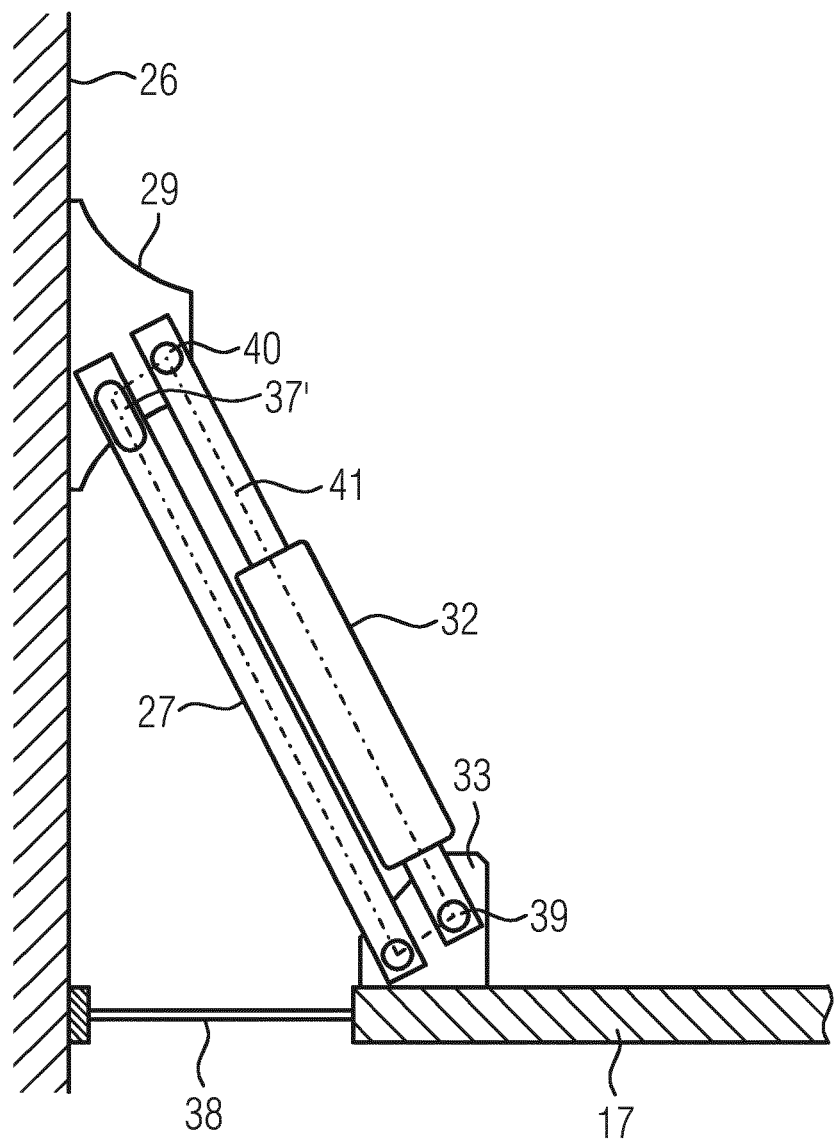
Figure 5:
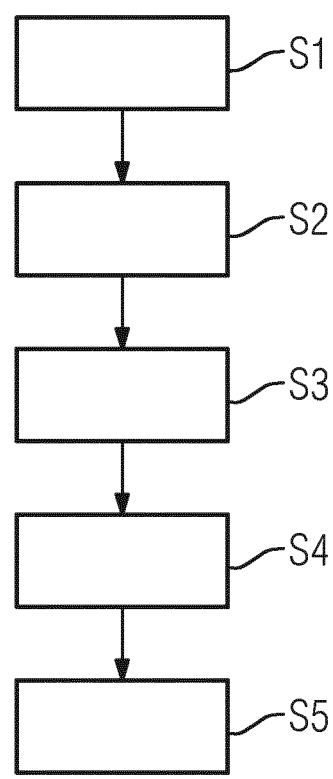

Some of the embodiments will be described in detail, with reference to the following figures, wherein like designations denote like members, wherein:
  FIG. 1 depicts, in partial cross-section, a wind turbine according to an embodiment;
  FIG. 2 depicts, in cross-section, a bottom tower section of the wind turbine of FIG. 1;
  FIG. 3 depicts schematically an enlarged view III from FIG. 2;
  FIG. 4 depicts an arrangement similar to FIG. 3 along with a service stay; and
  FIG. 5 depicts a flowchart illustrating a method for mounting the platform to a tower wall portion of the wind turbine according to an embodiment.

DETAILED DESCRIPTION

In the Figures, like reference numerals designate like or functionally equivalent elements, unless otherwise indicated.

FIG. 1 shows a wind turbine 1 according to an embodiment.

The wind turbine 1 comprises a rotor 2 connected to a generator 3 arranged inside a nacelle 4. The nacelle 4 is arranged at the upper end of a tower 5 of the wind turbine 1. The tower 5 is arranged on a transition piece 6. The transition piece 6 is erected on a monopile 7 which is hammered into the sea bed 8.

The rotor 2 comprises, for example, three rotor blades 9. The rotor blades 9 are connected to a hub 10 of the wind turbine 1. A shaft (not shown) connects the hub 10 to the generator 3.

The generator 3 is electrically connected to a switch gear 11 in the transition piece 6 by means of a high voltage cable (not shown).

The tower 5 comprises one or more tower sections 12, 13, 14. In the example of FIG. 1, the tower 5 comprises a bottom tower section 12, a middle tower section 13, and a top tower section 14. Each of the tower sections 12, 13, 14 is, for example, manufactured separately at a factory hall. The manufactured tower sections 12, 13, 14 are then assembled to form the tower 5, for example at a harbor site. The tower sections 12, 13, 14 include each one or more flanges 15 bolted to another tower section 12, 13, 14.

The tower 5 is then, for example, transported by means of a vessel to a wind harvesting site and erected onto the transition piece 6. The bottom tower section 12 of the tower 5 includes a flange 16 for a bolt connection with the transition piece 6.

The tower 5 comprises inside one or more platforms 17, 18, 19, 20. The tower 5 comprises, for example, a low voltage platform 17 in the bottom tower section 12 on which a low voltage transformer 42 (see FIG. 2) is located. The tower 5 comprises, for example, bolt platforms 18 and 19 configured for a worker to bolt the corresponding tower sections 12, 13, 14 to each other when assembling the tower 5.

The transition piece 6 comprises on its outside a landing platform 21 to provide access to the interior of the transition piece 6 and the tower 5. The transition piece 6 comprises further one or more platforms 22, 23 inside. For example, the transition piece 6 comprises a switch gear platform 22 on which the switch gear 11 is arranged. Further, the transition piece 6 comprises, for example, a bolt platform 23 for a worker to connect the transition piece 6 and the tower 5 by means of bolts. The platforms 22, 23 of the transition piece 6 of the example of FIG. 1 are integrated with each other in the form of a suspended internal platform (SIP) suspended from the flange 16 of the tower 5 or from a flange (not shown) of the transition piece 6 into the transition piece 6.

The transition piece 6 includes inside at a lower end thereof above the monopile 7 an airtight platform 24 to prevent poisonous gases from the sea bed 8 from entering the upper part of the transition piece 6.

FIG. 2 shows a detailed view of the bottom tower section 12 of the tower 5 of the wind turbine 1 of FIG. 1.

The bottom tower section 12 comprises the bolt platform 18 and the low voltage platform 17. The low voltage platform 17 is suspended from a tower wall portion 26 by means of four stays 27. The bottom tower section 12 comprises a top flange 15 for connection with the middle tower section 13. Further, the bottom tower section 12 comprises a bottom flange 16 for connection with the transition piece 6.

D1 denotes a diameter of the low voltage platform 17. D2 denotes an inner diameter of the tower 5 at the tower wall portion 26, in particular an inner diameter of the bottom tower section 12 at the tower wall portion 26. D3 denotes an inner diameter of the bottom tower section 12 at the bottom flange 16. D4 denotes an inner diameter of the bottom tower section 12 at the top flange 15. As can be seen in FIG. 2, the diameter D1 of the low voltage platform 17 is smaller than the inner diameter D2 of the tower 5 such that an annular gap 28 is formed between the low voltage platform 17 and the tower wall portion 26. Further, the diameter D1 of the low voltage platform 17 is also smaller than the inner diameter D3 of the bottom tower section 12 at the bottom flange 16 and the inner diameter D4 of the bottom tower section 12 at the top flange 15.

As the diameter D1 of the low voltage platform 17 is smaller than the inner diameters D3 and D4 at the flanges 16, 15, respectively, the low voltage platform 17 can be inserted into the vertically arranged bottom tower section 12 without building the low voltage platform 17 from segments or inclining the low voltage platform 17.

For example, the low voltage platform 17 can be inserted into the vertically arranged bottom tower section 12 through the bottom flange 16 by means of a lifting device such as a jack-up platform.

Alternatively, the low voltage platform 17 can be inserted into the vertically arranged bottom tower section 12 through the top flange 15 by means of a lowering device such as a crane.

FIG. 3 shows a detailed view III of the low voltage platform 17 connected to the tower wall portion 26 of the bottom tower section 12 from FIG. 2.

The tower wall portion 26 includes four wall brackets 29 welded to the tower wall portion 26. FIG. 3 shows as an example one of these wall brackets 29. Each of the wall brackets 29 include a first hole 30 pivotably connected to one of the four stays 27. Furthermore, each of the wall brackets 29 includes a second hole 31 for a connection with a service stay 32 (only shown in FIG. 4).

The low voltage platform 17 includes four platform brackets 33 fixedly connected to the low voltage platform 17. FIG. 3 shows as an example one of these four platform brackets 33. Each of the platform brackets 33 includes a first hole 34 pivotably connected to one of the four stays 27. Furthermore, each of the platform brackets 33 includes a second hole 35 for a connection with the service stay 32.

Each of the four stays 27 includes a first hole 36 pivotably connected to the first hole 34 of the platform bracket 33 by means of a fastener (not shown). Further, each of the four stays 27 includes a second hole 37 pivotably connected to the first hole 30 of the wall bracket 29 by means of a fastener (not shown). The fasteners are, in particular, bolts (not shown).

In FIG. 3, $\alpha$ denotes an angle between the platform 17 and the stay 27. Due to the stay 27 being pivotably connected to the platform 17 and the tower wall portion 26, the angle $\alpha$ can have values in the range of approximately 0 to 180 degrees, for example.

FIG. 4 shows the low voltage platform 17 connected to the tower wall portion 26 of the bottom tower section 12 along with the service stay 32 and a spacer 38.

In FIG. 4, the service stay 32 is connected to the tower wall portion 26 and the low voltage platform 17. In particular, the service stay 32 comprises a first hole 39 connected to the second hole 35 of the platform bracket 33. Further, the service stay 32 comprises a second hole 40 connected to the second hole 31 (FIG. 3) of the wall bracket 29. The service stay 32 is configured to be shortened and extended by hydraulic or electric means.

As shown in FIG. 4, when both the stay 27 and the service stay 32 are connected, the connections points of the service stay 32 on the platform 17 and the tower wall portion 26 and the connection points of the stay 27 on the platform 17 and the tower wall portion 26 form a parallelogram 41.

FIG. 4 also shows a further embodiment of the second hole 37' of the stay 27. The second hole 37' of the stay 27 is configured as a slotted hole.

The spacer 38 is arranged between the platform 17 and the tower wall portion 26. The spacer 38 is adjustable such that it can adjust to the size of the gap 28 (see FIGS. 2 and 3) between the platform 17 and the tower wall portion 26. Thus, the spacer 38 bridges the gap 28 such that it fixes the platform 17 in the horizontal direction. The spacer is for example a machine foot.

FIG. 5 shows a flowchart illustrating a method for mounting the low voltage platform 17 shown in FIGS. 1 to 4 to the tower wall portion 26 of the wind turbine 1.

In a first step S1, each of the four stays 27 is connected pivotably to the low voltage platform 17. In particular, each of the four stays 27 is connected to and pivoted relative to the low voltage platform 17 such that the angle $\alpha$ between the low voltage platform 17 and the stay 27 is about 90 degrees or smaller.

Then, the low voltage platform 17 with the four stays 27 connected to the platform 17 and folded in is inserted into the tower 5, in particular into the bottom tower section 12. The low voltage platform 17 is lifted by means of a jack to a desired height inside the bottom tower section 12.

In a second step S2, each of the four stays 27 is pivoted outwardly such that the angle $\alpha$ becomes larger than 90 degrees. In particular, each of the four stays 27 is pivoted such that the second hole 37 of the stay 27 is arranged close to the first hole 30 of the wall bracket 29. Each of the stays 27 is then connected to the tower wall portion 26 by engaging a fastener with the second hole 37 of the stay 27 and with the first hole 30 of the wall bracket 29.

Next, the spacer 38 is arranged between the platform 17 and the tower wall portion 26, as shown in FIG. 4. The length of the spacer 38 is adjusted to the size of the gap 28 (see FIGS. 2 and 3). In particular, the length of the spacer 38 is increased until it completely bridges the gap 28 and fixes the platform 17 in the horizontal direction. While FIG. 4 shows only one spacer 38, the platform 17 is fixed in the horizontal direction by two or more spacers 38.

The first and second steps S1, S2 are, for example, performed in a factory hall or at the harbor site. Next, the pre-fabricated tower section 12 is assembled with the other tower sections 13, 14, for example, at the harbor site. The tower 5 assembled from the tower sections 12, 13, 14 is then shipped to the wind harvesting site, where it is erected on the transition piece 6.

In case that, for example, during operation of the wind turbine, one or more of the stays 27 need to be replaced, the service stay 32, as shown in FIG. 4, is applied. A replacement of the stay 27 could, for example, become necessary because of a damage of the stay 27, e.g., by corrosion.

In a third step S3, the service stay 32 is connected to the low voltage platform 17 and the tower wall portion 26. In particular, the service stay 32 is connected to the second hole 35 (FIG. 3) of the platform bracket 33 and to the second hole 31 (FIG. 3) of the wall bracket 29.

Then, the service stay 32 is shortened by hydraulic or electric means until the service stay 32 carries the weight of the low voltage platform 17. Thus, the stay 27 does not carry the weight of the low voltage platform 17 anymore and can be easily removed. In this position, the service stay 32 is locked by means of a locking mechanism, in particular a mechanical locking mechanism. The locking mechanism includes, for example, an engagement of elements of the hydraulic or electric means such that a further shortening or extension of the hydraulic or electric means is prevented.

In a fourth step S4, the damaged stay 27 is replaced. In particular, the damaged stay 27 is demounted from the wall bracket 29 and the platform bracket 33. The damaged stay 27 is repaired or replaced by a new stay 27. The repaired or new stay 27 is then mounted to the wall bracket 29 and the platform bracket 33 as describe in step S1.

In a fifth step S5, the service stay 32 is disconnected from the low voltage platform 17 and from the wall tower portion 26. In particular, the service stay 32 is unlocked and extended by the hydraulic or electric means until the weight of the platform 17 is supported by the repaired or new stay 27. Then, the service stay 32 is disconnected from the low voltage platform 17 and from the wall tower portion 26.

Although the present invention has been described in accordance with exemplary embodiments, it is obvious for the person skilled in the art that modifications are possible in all embodiments.

For example, instead of using the stays 27 to connect the low voltage platform 17 to the tower wall portion 26 of the tower 5, it can be used to mount any of the platforms 17, 18, 19, 20 to the tower wall portion 26 of tower 5.

Furthermore, instead of using the stays 27 to mount any of the platforms 17, 18, 19, 20 to the tower wall portion 26 of the tower 5, it can be used to mount any of the platforms 22, 23 of the transition piece 6 to a wall portion of the transition piece 6.

In the described embodiment, the stays 27 are connected in the first step S1 to the platform 17 and connected in the second step S2 to the wall portion 26. However, it is also possible to connect in the first step S1 the stays 27 pivotably to the wall portion 26, to insert the platform 17 into the tower 5, to pivot in the second step S2 the stays 27 outwardly, and to connect the stays 27 to the platform 17.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A wind turbine, comprising:
  a tower having one or more tower sections, a tower section of the one or more tower sections including a wall portion and a flange;
  at least one wall bracket attached to the wall portion;
  a platform arranged within the tower section;
  at least one platform bracket attached to the platform
  a stay suspending the platform from the wall portion, the stay pivotably connecting, at a first end, to the at least one wall bracket and, at a second end, to the at least one platform bracket, wherein the at least one wall bracket is offset from the at least one platform bracket to account for a gap between the wall portion and the platform;
  wherein the stay being pivotably connected to the at least one wall bracket and the at least one platform bracket allows for an angle between the platform and the stay can range from 0 to 180 degrees;
  wherein a diameter of the platform is smaller than an inner diameter of the tower section at the flange.

2. The wind turbine according to claim 1, configured for connecting a service stay to the platform and the wall portion, the service stay suspending the platform from the wall portion to allow replacement of the stay.

3. The wind turbine according to claim 2, wherein the service stay, when connected, forms at connection points on the platform and the wall portion together with connection points of the stay on the platform and the wall portion a parallelogram.

4. The wind turbine according to claim 1, wherein the platform and/or the wall portion comprise holes at which the stay is connected pivotably and/or at which the service stay is connectable.

5. The wind turbine according to claim 4, wherein one or more of the holes are slotted holes.

6. The wind turbine according to claim 1, further comprising a service stay.

7. The wind turbine according to claim 6, wherein the service stay is configured to be shortened and extended.

8. The wind turbine according to claim 7, wherein the service stay comprises hydraulic or electric means for shortening and extension.

9. The wind turbine according to claim 7, wherein the service stay is configured to be locked at a desired state when shortened or extended.

10. The wind turbine according to claim 1, wherein the diameter of the platform is smaller than an inner diameter of the tower at the wall portion such that a gap is formed between the platform and the wall portion.

11. The wind turbine according to claim 10, further comprising a spacer arranged between the platform and the wall portion, the spacer being configured to bridge the gap so as to fix the platform in a horizontal direction.

12. The wind turbine according to claim 1, wherein the platform comprises a low voltage transformer.

13. A method for mounting a platform to a wall portion of a tower section of a wind turbine, wherein a diameter of the platform is smaller than an inner diameter of the tower section of the wind turbine at a flange of the wind turbine, the method comprising:
  connecting a stay pivotably to at least one wall bracket attached to the wall portion and at least one platform bracket attached to the platform, wherein the at least one wall bracket is offset from the at least one platform bracket to account for a gap between the wall portion and the platform, and the stay being pivotably connected to the at least one wall bracket and the at least one platform bracket allows for an angle between the platform and the stay can range from 0 to 180 degrees; and pivoting the stay and connecting the stay to the other one of the platform and the wall portion to suspend the platform from the wall portion.

14. The method according to claim 13, further comprising:
connecting a service stay to the platform and the wall portion;
replacing the stay; and
disconnecting the service stay from the platform and the wall tower portion.

15. A method comprising:
utilizing a service stay in the wind turbine of one claim 1 to temporarily connect the platform and the wall portion in order to replace the stay.

* * * * *